United States Patent
Ross et al.

(10) Patent No.: US 9,872,449 B2
(45) Date of Patent: Jan. 23, 2018

(54) HYDROPONICS APPARATUS

(71) Applicants: Adam Ross, Northport, NY (US); Jon Borriello, Northport, NY (US)

(72) Inventors: Adam Ross, Northport, NY (US); Jon Borriello, Northport, NY (US)

(*) Notice: Subject to any disclaimer, the term of this patent is extended or adjusted under 35 U.S.C. 154(b) by 60 days.

(21) Appl. No.: 14/538,149

(22) Filed: Nov. 11, 2014

(65) Prior Publication Data

US 2015/0135593 A1   May 21, 2015

Related U.S. Application Data

(60) Provisional application No. 61/902,422, filed on Nov. 11, 2013.

(51) Int. Cl.
*A01G 31/00* (2006.01)
*A01G 31/02* (2006.01)

(52) U.S. Cl.
CPC ............ *A01G 31/02* (2013.01); *Y02P 60/216* (2015.11)

(58) Field of Classification Search
CPC ........ A01G 31/00; A01G 31/02; A01G 31/06; A01G 9/18; A01G 9/24
USPC ......................................... 47/62, 62 A, 62 C
See application file for complete search history.

(56) References Cited

U.S. PATENT DOCUMENTS

| | | | | |
|---|---|---|---|---|
| 4,315,381 A * | 2/1982 | Dvorin | ............ | A01G 31/02 47/59 R |
| 5,010,686 A * | 4/1991 | Rivest | ............ | A01G 31/02 47/62 C |
| 5,394,647 A * | 3/1995 | Blackford, Jr. | ........ | A01G 31/02 47/59 R |
| 5,557,884 A * | 9/1996 | Deppe | ............ | A01G 31/02 47/62 E |
| 6,219,966 B1 * | 4/2001 | Lapointe | ............ | A01G 31/02 47/62 C |
| 6,247,266 B1 * | 6/2001 | Borgen | ............ | A01G 27/00 47/58.1 R |
| 6,276,089 B1 * | 8/2001 | Boisclair | ............ | A01G 31/02 47/60 |
| 6,336,292 B1 * | 1/2002 | Boxsell | ............ | A01G 31/02 47/62 C |

(Continued)

OTHER PUBLICATIONS

High Capacity Bench Top Units. (Nov. 16, 2009). Retrieved from AgriHouse : https://web.archive.org/web/20091116073317/http://www.aeroponics.com/aero6m.htm.*

*Primary Examiner* — Joshua D Huson
*Assistant Examiner* — Aaron M Rodziwicz
(74) *Attorney, Agent, or Firm* — F. Chau & Associates, LLC (57) ABSTRACT

A hydroponics apparatus includes a plurality of rails, a plurality of chambers formed beneath the plurality of rails, a plurality of pod inserts disposed on the upper surfaces of the plurality of rails, a plurality of air lines, and a plurality of hoses. The upper surface of each of the plurality of rails is angled upward relative to a horizontal plane. Each of the plurality of pod inserts is configured to receive a plant. Each of the plurality of air lines is disposed in a rail of the plurality of rails, and the plurality of air lines are configured to transport air through the plurality of chambers. Each of the plurality of hoses is disposed in a rail of the plurality of rails and includes a plurality of atomization sprayers. The plurality of atomization sprayers are configured to spray a solution within the plurality of chambers.

6 Claims, 10 Drawing Sheets

(56) References Cited

U.S. PATENT DOCUMENTS

| | | | |
|---|---|---|---|
| 8,505,238 B2* | 8/2013 | Luebbers | A01G 31/02 47/62 A |
| 2009/0126269 A1* | 5/2009 | Wilson | A01G 31/00 47/62 R |
| 2012/0192487 A1* | 8/2012 | Tanaka | A01G 31/02 47/60 |
| 2014/0020292 A1* | 1/2014 | McNamara | A01G 9/246 47/66.6 |
| 2014/0083008 A1* | 3/2014 | Kotsatos | A01G 31/06 47/62 N |
| 2014/0283452 A1* | 9/2014 | Dittman | A01G 31/06 47/62 R |
| 2015/0068121 A1* | 3/2015 | Probst | A01G 31/06 47/59 R |

* cited by examiner

HYDROPONICS APPARATUS

CROSS-REFERENCE TO RELATED APPLICATIONS

This application claims priority to and the benefit of Provisional Application Ser. No. 61/902,422, filed on Nov. 11, 2013, the disclosure of which is herein incorporated by reference in its entirety.

BACKGROUND

1. Technical Field

Exemplary embodiments of the present invention relate to a hydroponics apparatus and method, and more particularly, to a hydroponics apparatus and method resulting in a fast and efficient manner of growing of plants without soil.

2. Discussion of Related Art

Hydroponics refers to a method of growing plants using a nutrient solution without soil. Plants may be disposed on a hydroponics apparatus in a manner allowing for the roots of the plants to receive sufficient nutrients, allowing for growth of the plants.

SUMMARY

According to an exemplary embodiment of the present invention, a hydroponics apparatus includes a plurality of rails, wherein an upper surface of each of the plurality of rails is angled upward relative to a horizontal plane, a plurality of chambers formed beneath the plurality of rails, a plurality of pod inserts disposed on the upper surfaces of the plurality of rails, wherein each of the plurality of pod inserts is configured to receive a plant, a plurality of air lines, wherein each of the plurality of air lines is disposed in a rail of the plurality of rails, and the plurality of air lines are configured to transport air through the plurality of chambers, and a plurality of hoses, wherein each of the plurality of hoses is disposed in a rail of the plurality of rails and includes a plurality of atomization sprayers, and the plurality of atomization sprayers are configured to spray a solution within the plurality of chambers.

In an exemplary embodiment, the upper surface of each of the plurality of rails is angled upward relative to the horizontal plane at an angle of about 45 degrees.

In an exemplary embodiment, the plurality of pod inserts are removable.

In an exemplary embodiment, the apparatus further includes a plurality of removable end caps disposed on side surfaces of the plurality of rails, wherein the plurality of removable end caps permit access to the plurality of chambers.

In an exemplary embodiment, the apparatus further includes a reservoir configured to house at least one of a tank, pump, or regulator.

In an exemplary embodiment, us of claim 5, the apparatus further includes a control screen providing an input/output (I/O) interface to a user.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

Exemplary embodiments of the present invention will be described more fully hereinafter with reference to the accompanying drawings. Like reference numerals may refer to like elements throughout the accompanying drawings.

Exemplary embodiments of the present invention relate to a hydroponics apparatus that allows for an improved method of growing of plants without soil. For example, in exemplary embodiments, the roots of plants are disposed in a sealed controlled chamber within a hydroponics apparatus. Manipulation of the specific air and water quality in the sealed controlled chamber allows for the selection of ideal growing conditions for reducing or eliminating stress levels without the use of pesticides or fertilizers, and allows for less water to be used, resulting in improved plant growth.

FIGS. 1-5 show a hydroponics apparatus, according to an exemplary embodiment of the present invention.

Figure 1:
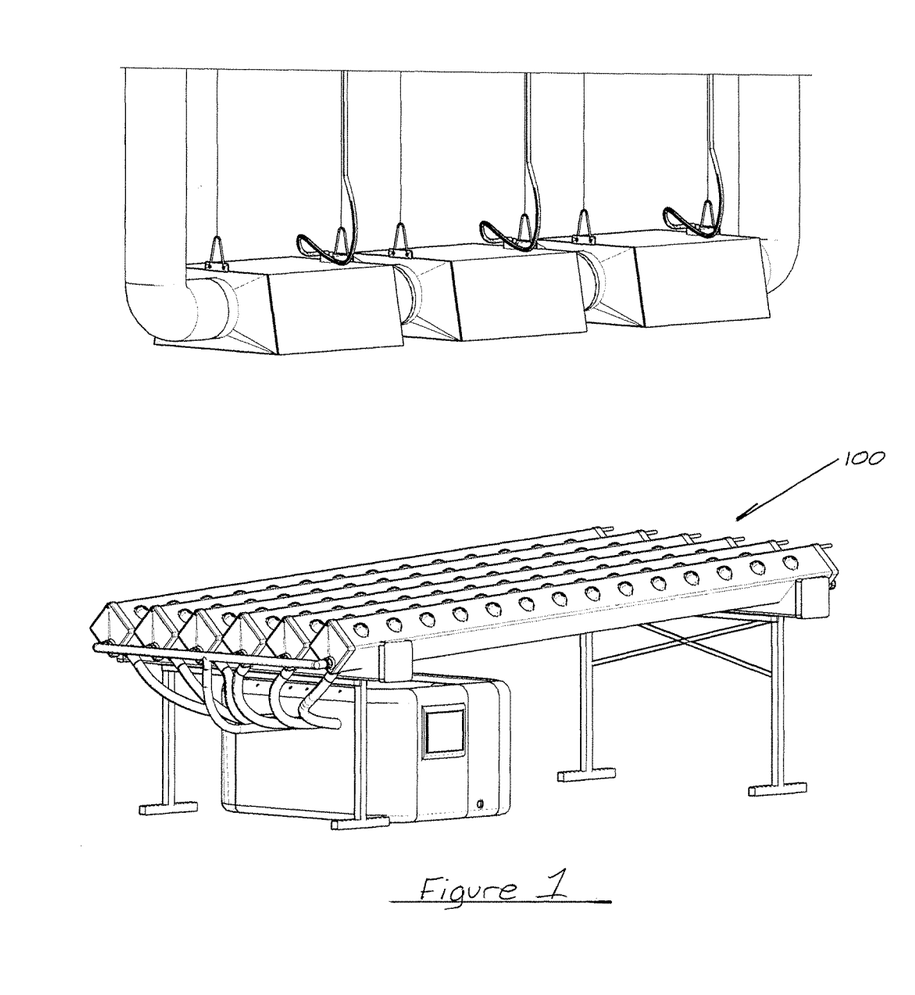
FIGS. 1-5 show a hydroponics apparatus, according to an exemplary embodiment of the present invention.
Figure 2:
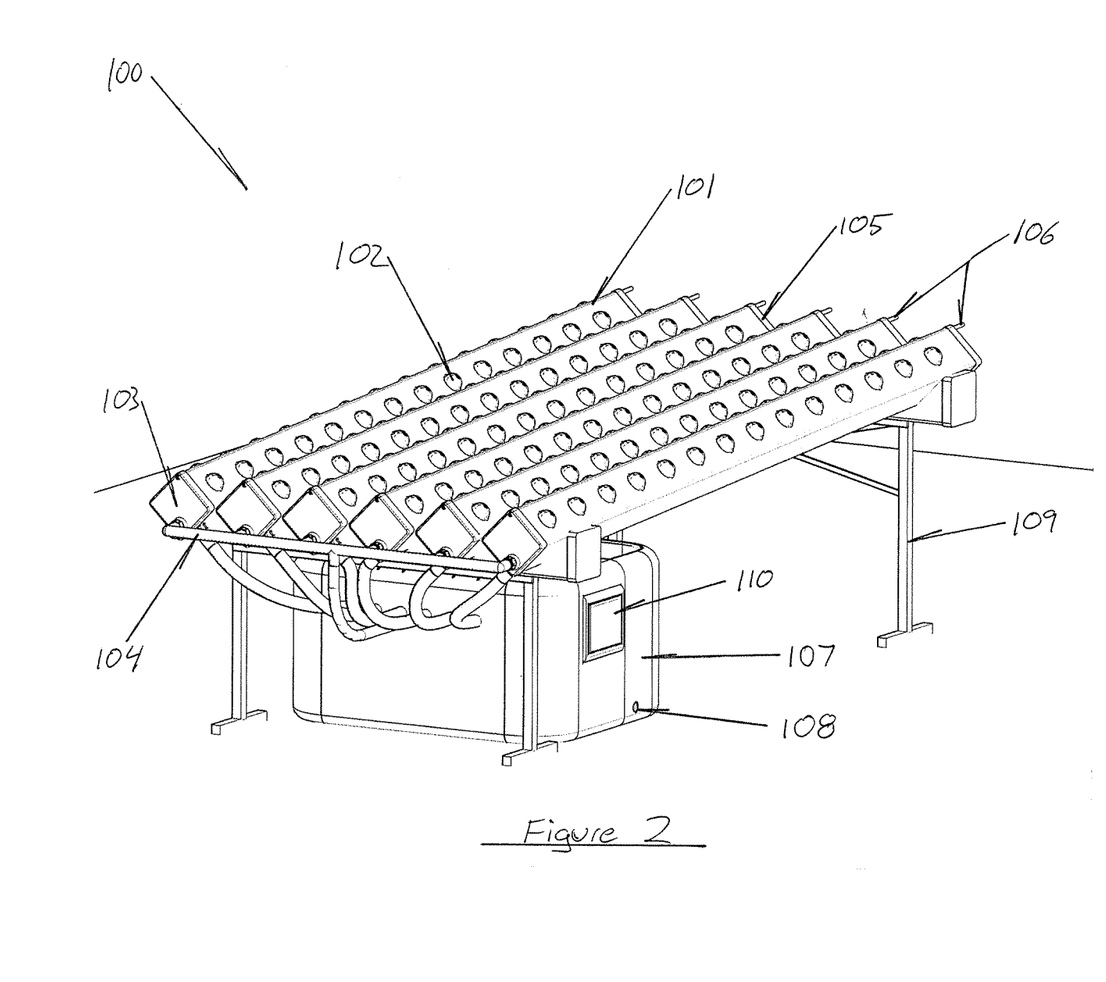
Figure 3:
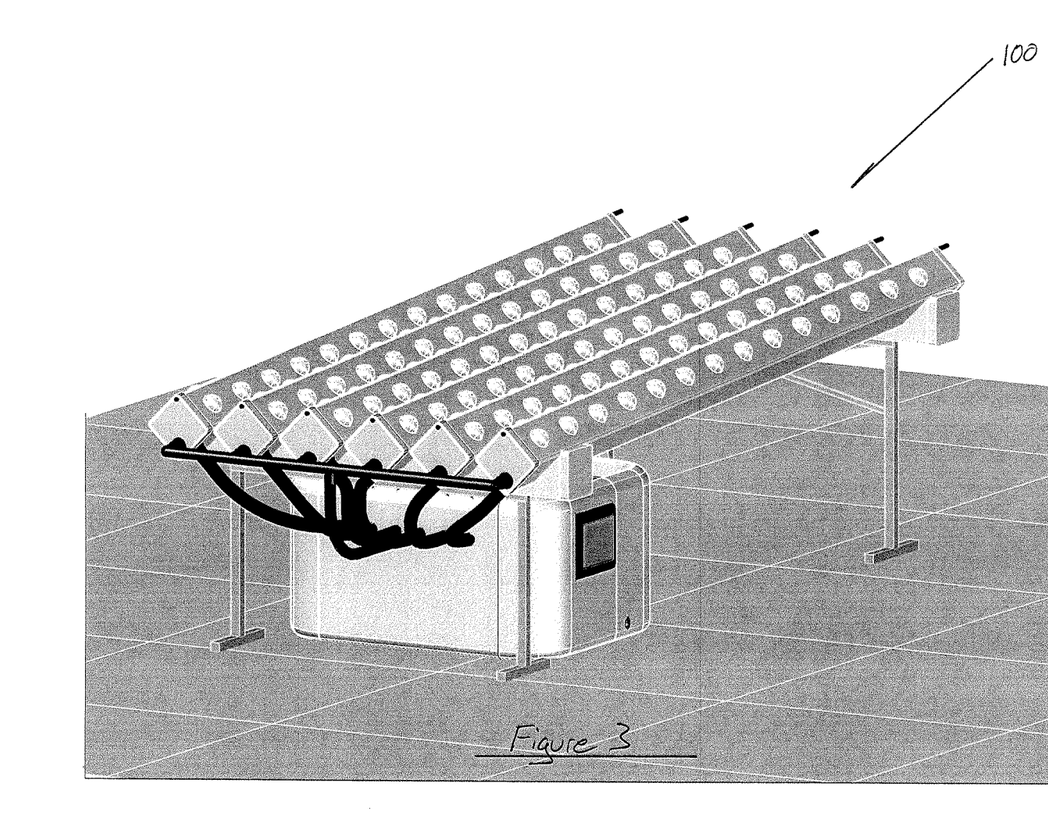
Figure 4:
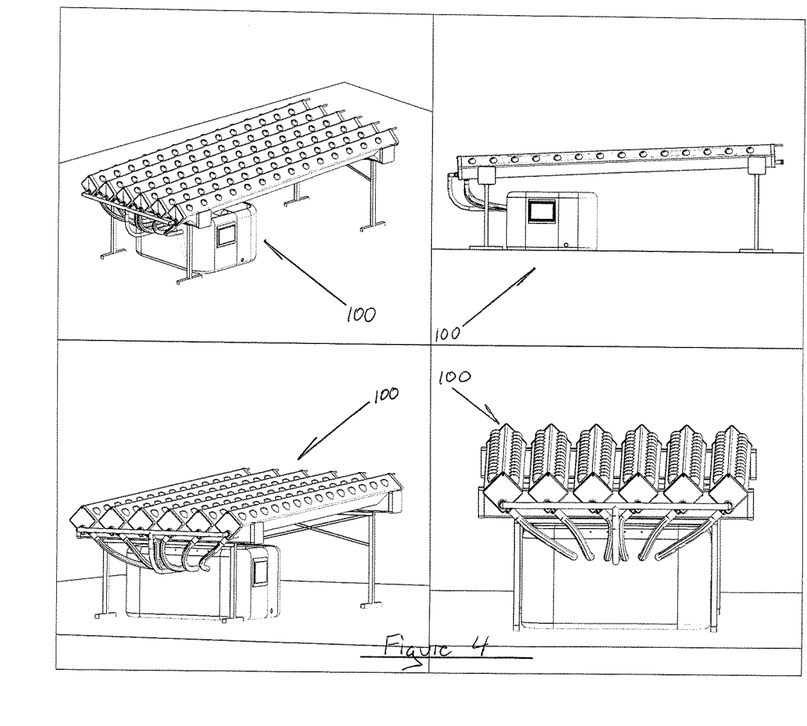
Figure 5:
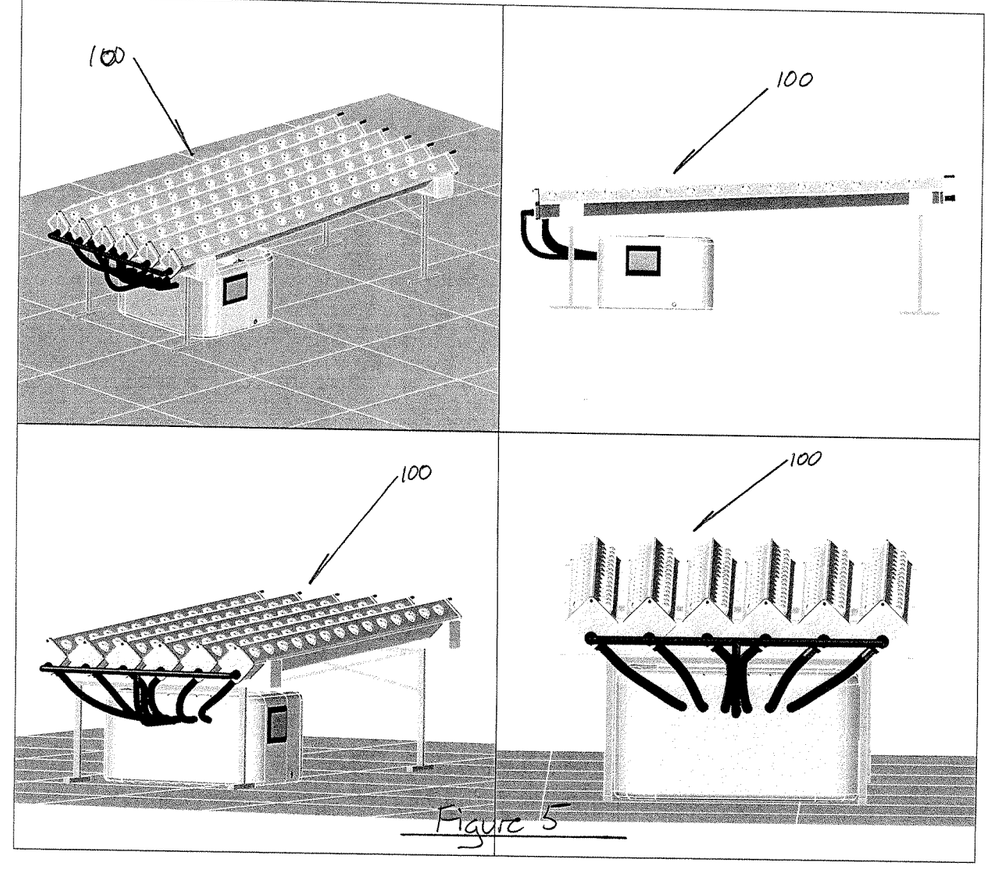

Referring to FIG. 2, the hydroponics apparatus 100 includes a plurality of angled rails 101. The upper surface of the rails 101 may be disposed at various angles relative to a horizontal plane, allowing for a greater surface area, which results in the ability to receive an increased number of plants. For example, each of the plurality of rails 101 may have an upper surface disposed at an angle of about 45 degrees relative to a horizontal plane, however, the angle is not limited thereto. The rails 101 include a plurality of holes disposed on the upper surface and configured to receive plants, and a plurality of pod inserts 102 may be disposed in the holes on the rails 101. The pod inserts 102 may be disposed at regular intervals along the rails 101. In an exemplary embodiment, the pod inserts 102 may be disposed in different locations and/or at different intervals along adjacent rails 101, providing more space for plants growing from the different pod inserts 102 in adjacent rails 101. The pod inserts 102 are designed to allow for the plants to be secured in the rails 101. When a plant is not disposed in a pod insert 102, the pod insert 102 may be replaced with a pod cover, or an unused pod insert 102 may be utilized as a pod cover. The pod inserts 102 include holes allowing for the plants to grow through the pod inserts 102. Different pod inserts 102 may have holes of different sizes, which may be used for different types of plants. The pod inserts 102 may be removable, allowing for the hydroponics apparatus 100 to utilize a variety of different sized pod inserts 102.

Figure 6:
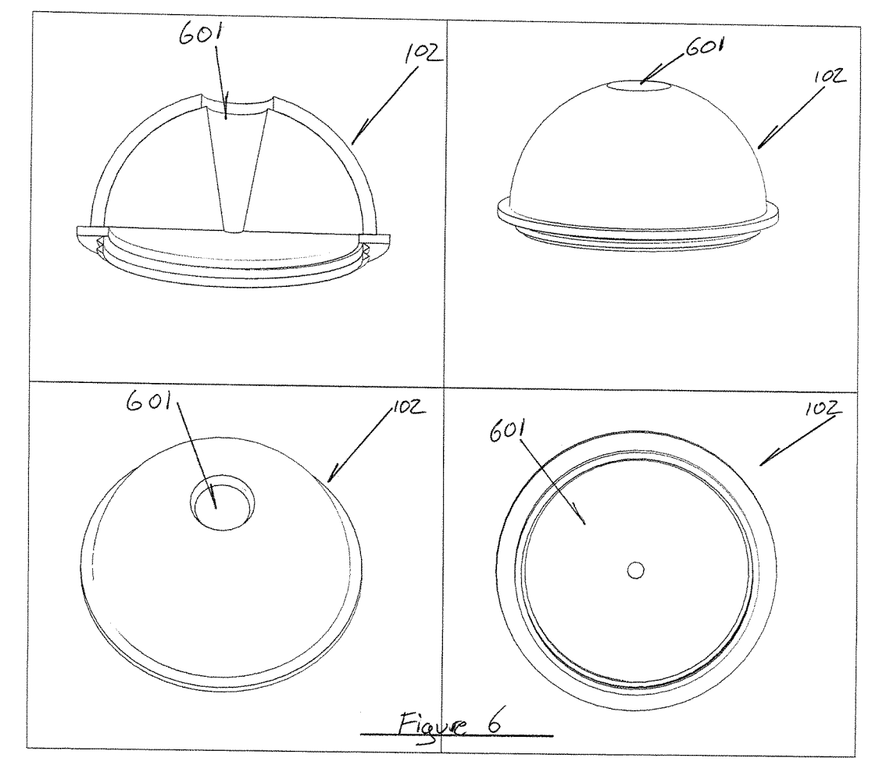
FIG. 6 shows different views of a pod insert, according to an exemplary embodiment of the present invention.

FIG. 6 shows different views of a pod insert, according to an exemplary embodiment of the present invention.

Referring to FIG. 6, each pod insert 102 includes a hole 601, as described above. The hole 601 may extend evenly from the top of the pod insert 102 to the bottom of the pod insert 102, or as shown in FIG. 6, may be tapered from the top of the pod insert 102 to the bottom of the pod insert 102. The pod inserts 102 may attach to the holes of the rails 101 in a variety of manners including, for example, snapping into the holes, screwing into the holes, etc.

The growth of plants may be started using, for example, plant seeds or cuttings. The seeds or cuttings may be placed within the pod inserts 102. Utilization of the pod inserts 102 results in the plant's root system being suspended within a sealed chamber 103 of the hydroponics apparatus 100. The sealed chamber 103 is an enclosed area formed by the rails 102 and disposed beneath the upper surface of the rails 102. The suspended root system of the plants may then be sprayed with a nutrient solution via a hose 701 disposed within the rails 102 and connected to a manifold 104 coupled to a side surface of the rails 102. The nutrient solution may include a variety of nutrients, may include water, etc. The manifold may be, for example, a one-piece manifold 104. The hose 701 is described in further detail with reference to FIG. 7. Using this configuration, different element levels (e.g., $N_2$, $O_2$, $CO_2$, etc.) may be controlled and maintained.

Figure 7:
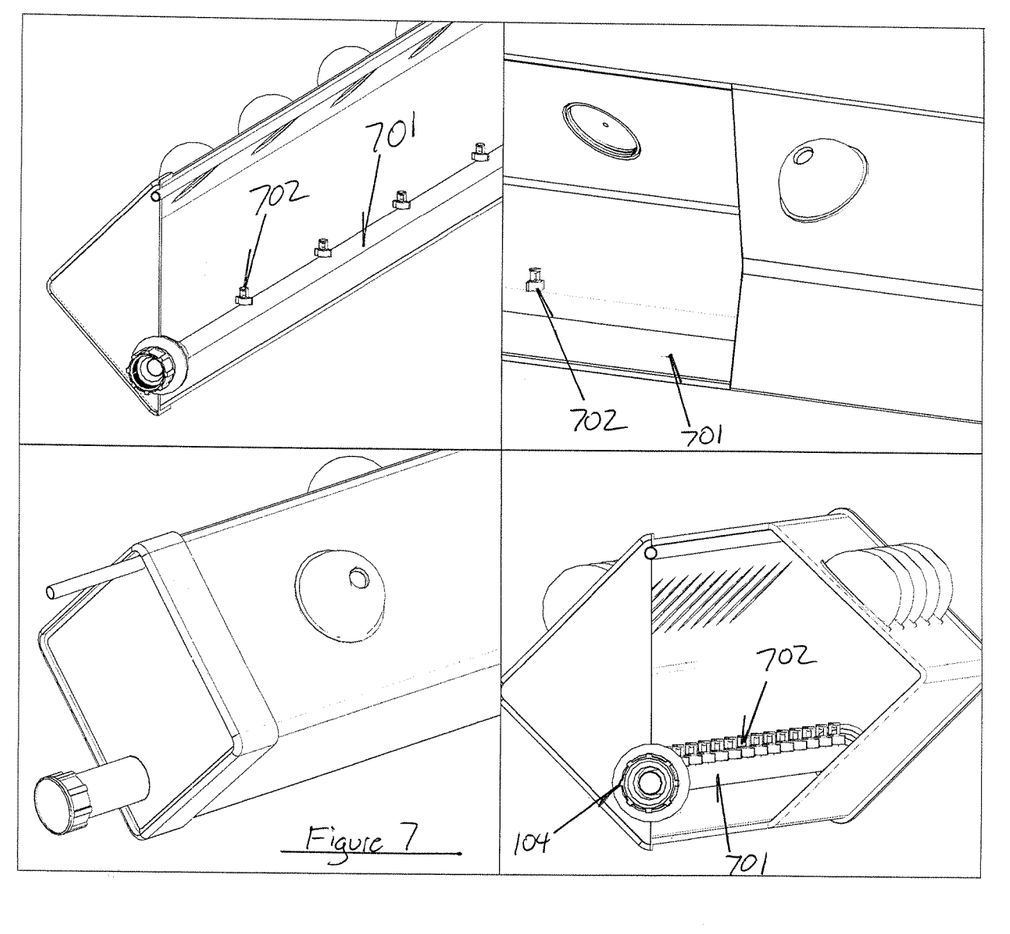
FIGS. 7 and 8 show a side portion of a rail of the hydroponics apparatus, according to an exemplary embodiment of the present invention.
Figure 8:
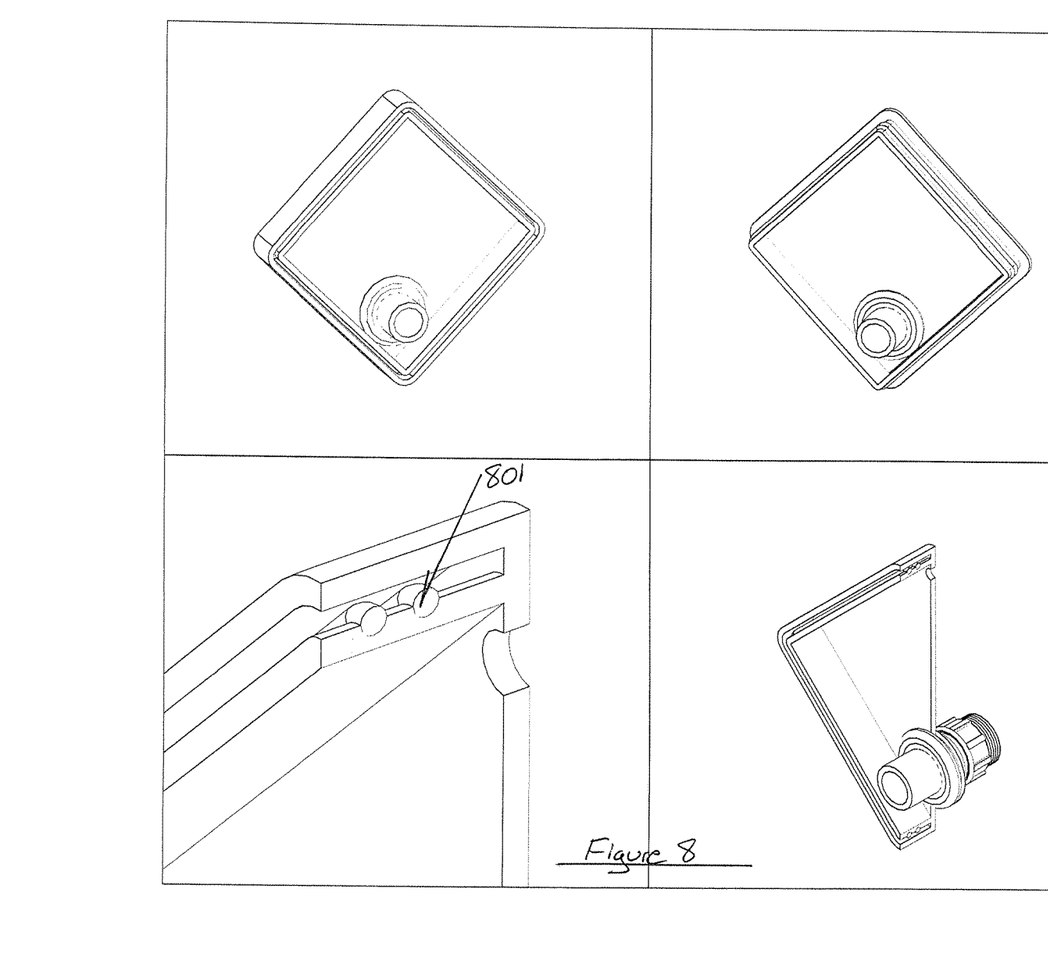

FIGS. 7 and 8 show a side portion of a rail of the hydroponics apparatus, according to an exemplary embodiment of the present invention.

Referring to FIGS. 2 and 7-8, the hydroponics apparatus 100 may include removable end caps 105 disposed on one of the sides of the rails 102. The utilization of removable end caps 105 allows for the chamber 103 and the components disposed within the chamber 103 to be accessed. An air line 106 may be disposed within each rail 102 and may be accessible via the end of the rail 102 including the removable end cap 105. The air lines 106 allow for the manipulation of air quality within the chambers 103 of the rails 102. The hose 701, which is disposed within each chamber 103 and is connected to the manifold 104, includes a plurality of atomization sprayers 702, allowing for the spraying of nutrients within the chamber 103. A rubber seal 801 may be disposed within the chamber 103, sealing the chamber 103.

Figure 9:
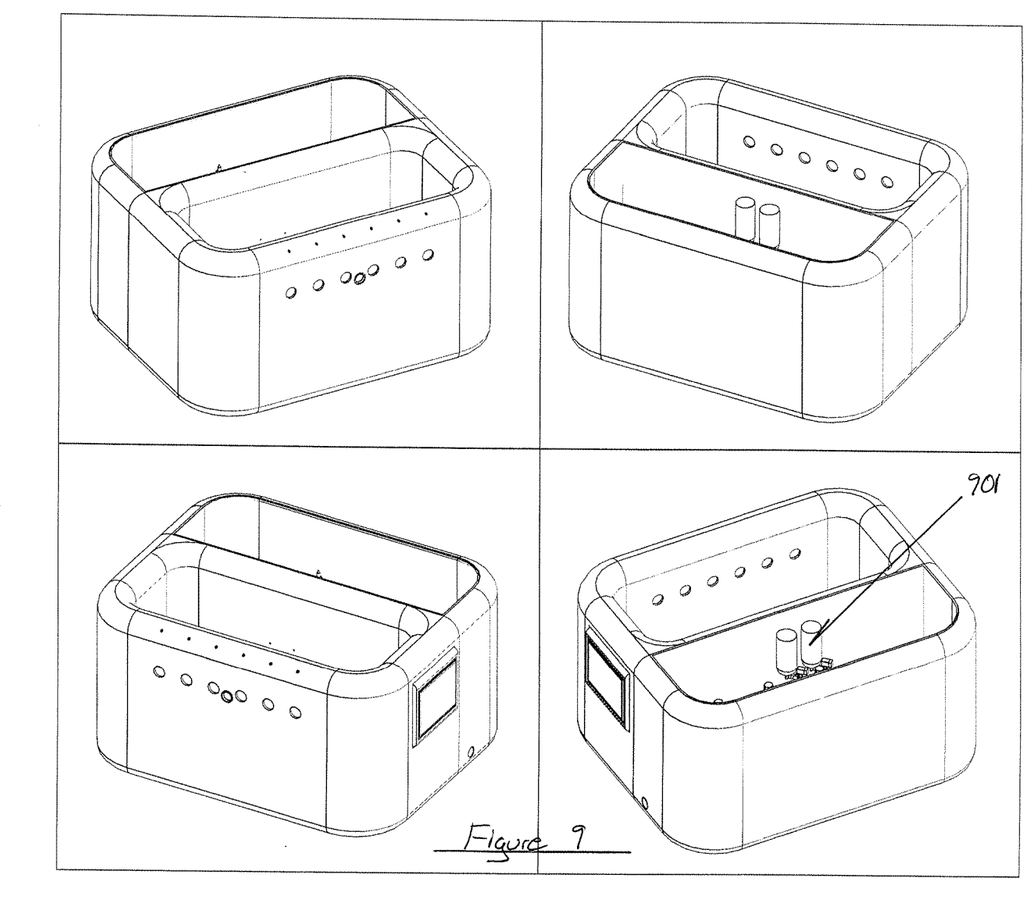
FIGS. 9 and 10 show a reservoir of the hydroponics apparatus, according to an exemplary embodiment of the present invention.
Figure 10:
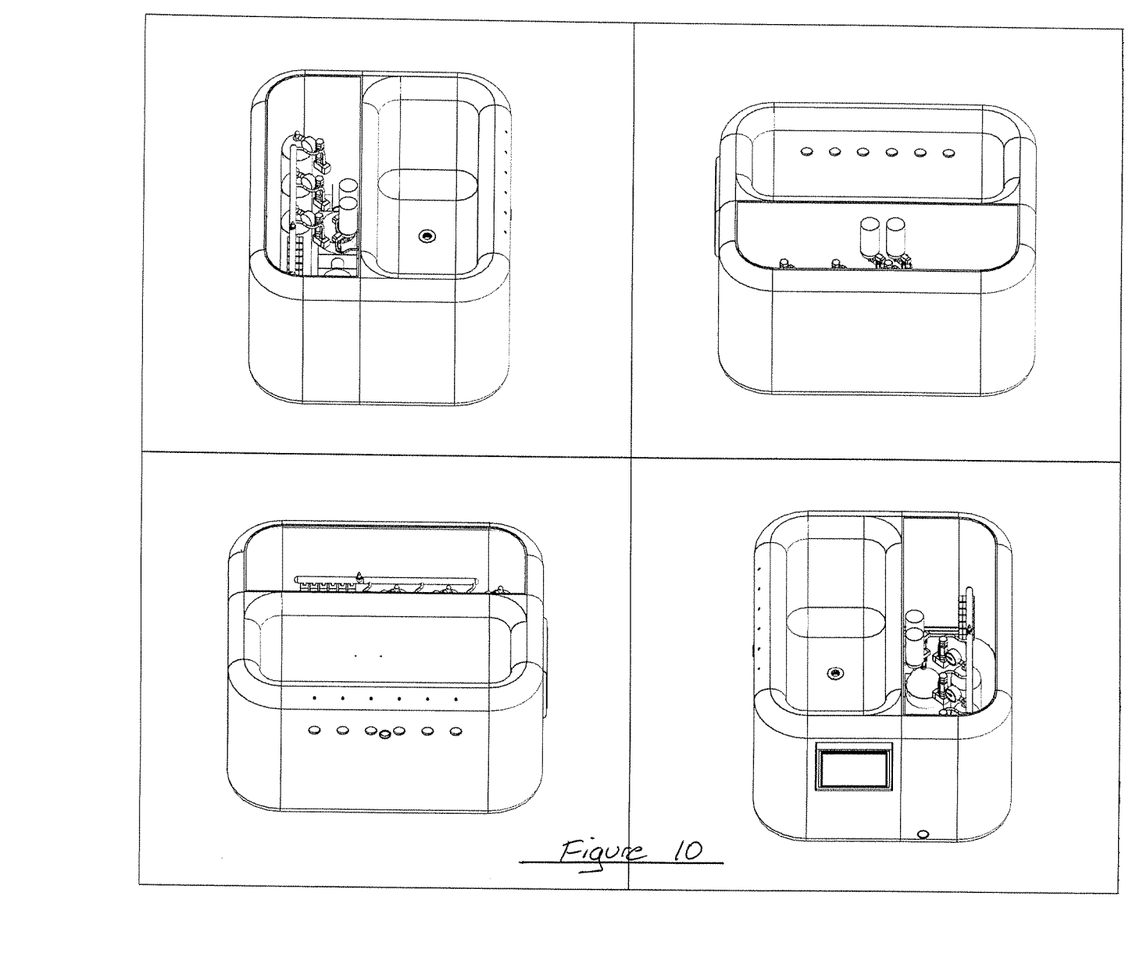

FIGS. 9 and 10 show a reservoir of the hydroponics apparatus, according to an exemplary embodiment of the present invention.

Once the nutrient solution is sprayed onto the plant roots via the atomization sprayers 702, the solution flows back down the rails 103, through a drain, and back into a reservoir 107 to be re-circulated, resulting in a method of growing plants that may be fast and efficient.

The reservoir 107 and corresponding housing may include a variety of tanks, (e.g., $N_2$, $O_2$, $CO_2$, etc.), pumps, regulators, etc. used for irrigating plants in the hydroponics apparatus 100. The reservoir 107 may include a drain (e.g., an automatic drain) 108 allowing for easy reservoir exchange. The automatic drain 108 may include, for example, a water pump built into the reservoir 107 that allows for easy draining. A drain outlet may be built into the side of the automatic drain 108 as a hose attachment. The various tanks, pumps, regulators, etc. may be built into the reservoir 107 and may be removable, allowing for replacement of these components when necessary. The tanks, pumps, regulators, etc. may be solenoid operated and triggered by sensors built into chambers, allowing for the regulation and maintaining of air quality. Sensors may be included in the reservoir 107 and/or the chambers 103 and rails 101.

The reservoir 107 may further include a temperature device (e.g., a chiller/heater). The temperature device allows for the temperature of the solution to be controlled, and allows for the adjustment of oxygenation levels (e.g., the highest possible oxygenation levels may be obtained). A PH adjustment system 901 may be implemented in the reservoir 107. For example, sensors implementing the PH system allow the acidity of the nutrient solution to be regulated and maintained. Air pumps may be utilized to aerate the solution, and an air pump may be used to control air qualities within the chamber 103. A main feed pump (e.g., a built-in pump) may supply the chambers 103 with the nutrient solution.

The reservoir 107 may include a control screen (e.g., an LCD screen) 110, which provides a user with information and allows the user to provide user input. For example, all programs, processes and growing conditions may be selected, monitored and maintained without disrupting the growth cycle of the plants via the control screen 110. The reservoir may further include a wireless transceiver, allowing for all programs, processes and growing conditions to be selected, monitored and maintained remotely.

The hydroponics apparatus 100 may include a collapsible stand 109, which supports the hydroponics apparatus 100, and allows for the hydroponics apparatus to be conveniently moved and stored when not in use.

Having described exemplary embodiments for a hydroponics apparatus and method, it is noted that modifications and variations can be made by persons skilled in the art in light of the above teachings. It is therefore to be understood that changes may be made in exemplary embodiments of the invention, which are within the scope and spirit of the invention as defined by the appended claims. Having thus described the invention with the details and particularity required by the patent laws, what is claimed and desired protected by Letters Patent is set forth in the appended claims.

What is claimed is:

1. A hydroponics apparatus, comprising:
   a plurality of rails,
   wherein each rail comprises a first surface, a second surface connected to the first surface at an upper corner of the rail, a third surface connected to the second surface at a first side corner of the rail, and a fourth surface connected to the third surface at a lower corner of the rail and connected to the first surface at a second side corner of the rail,
   wherein the upper corner is opposite to the lower corner, and the first side corner is opposite to the second side corner,
   wherein each of the first surface and the second surface is angled upward relative to a horizontal planet, and each of the third surface and the fourth surface is angled downward relative to the horizontal plane;
   a plurality of chambers formed within the plurality of rails;
   a first plurality of pod inserts disposed on the first surface of each of the plurality of rails;
   a second plurality of pod inserts disposed on the second surface of each of the plurality of rails, wherein each of the first and second plurality of pod inserts is configured to receive a plant;
   a plurality of air lines disposed within the plurality of chambers in the upper corners of the rails, wherein the plurality of air lines is configured to transport air through the plurality of chambers; and
   a plurality of hoses disposed within the plurality of chambers in the lower corners of the rails,
   wherein the plurality of hoses comprises a plurality of atomization sprayers disposed only within the plurality of the chambers, and the plurality of atomization sprayers is configured to spray a solution within the plurality of chambers.

2. The hydroponics apparatus of claim 1, wherein the first and second plurality of pod inserts are removable.

3. The hydroponics apparatus of claim 1, further comprising a plurality of removable end caps disposed on side surfaces of the plurality of rails, wherein the plurality of removable end caps permit access to the plurality of chambers.

4. The hydroponics apparatus of claim 1, further comprising a reservoir configured to house at least one of a tank, pump, or regulator.

5. The hydroponics apparatus of claim 4, further comprising a control screen disposed on the reservoir and configured to provide an input/output (I/O) interface to a user.

6. The hydroponics apparatus of claim 1, wherein the plurality of air lines and the plurality of hoses extend only in a lengthwise direction within the plurality of chambers.

* * * * *